US007966376B2

(12) United States Patent
Kelso et al.

(10) Patent No.: US 7,966,376 B2
(45) Date of Patent: Jun. 21, 2011

(54) PREVENTING THE CAPTURE OF CHAT SESSION TEXT

(75) Inventors: Scott Edwards Kelso, Durham, NC (US); John Carl Mese, Cary, NC (US); Nathan J. Peterson, Raleigh, NC (US); Rod David Waltermann, Durham, NC (US); Arnold S. Weksler, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1253 days.

(21) Appl. No.: 10/927,555

(22) Filed: Aug. 26, 2004

(65) Prior Publication Data

US 2006/0047748 A1   Mar. 2, 2006

(51) Int. Cl.
*G06F 15/16* (2006.01)

(52) U.S. Cl. ........ 709/206; 709/204; 709/203; 709/228; 709/207

(58) Field of Classification Search .................. 709/204, 709/206

See application file for complete search history.

(56) References Cited

U.S. PATENT DOCUMENTS

| 6,310,694 | B1 | 10/2001 | Okimoto et al. | 358/1.15 |
|---|---|---|---|---|
| 6,721,784 | B1* | 4/2004 | Leonard et al. | 709/206 |
| 2002/0026487 | A1* | 2/2002 | Ogilvie et al. | 709/206 |
| 2002/0174010 | A1* | 11/2002 | Rice, III | 705/14 |
| 2003/0023683 | A1 | 1/2003 | Brown et al. | 709/204 |
| 2003/0037112 | A1* | 2/2003 | Fitzpatrick et al. | 709/205 |
| 2003/0078972 | A1* | 4/2003 | Tapissier et al. | 709/204 |
| 2004/0078446 | A1 | 4/2004 | Daniell et al. | 709/206 |
| 2005/0021624 | A1* | 1/2005 | Herf et al. | 709/204 |
| 2005/0055416 | A1* | 3/2005 | Heikes et al. | 709/207 |
| 2005/0204130 | A1* | 9/2005 | Harris | 713/165 |
| 2007/0111794 | A1* | 5/2007 | Hogan et al. | 463/42 |
| 2008/0163384 | A1* | 7/2008 | Crance | 726/33 |

OTHER PUBLICATIONS

Hamilton et al., "Dissemination Control of Email Text," Dossier AUS920020397US1, Sep. 10, 2002, p. 1.

* cited by examiner

*Primary Examiner* — Jeffrey Pwu
*Assistant Examiner* — Sulaiman Nooristany
(74) *Attorney, Agent, or Firm* — Winstead, P.C.

(57) ABSTRACT

A method, system, and computer program product for disabling the capturing of chat session text. A chat session participant may store a profile for informing other chat session participants of preferences regarding the capture of chat session text. A chat session user may disable another user's ability to capture text. A chat session user may request that another user not capture text.

14 Claims, 10 Drawing Sheets

PREVENTING THE CAPTURE OF CHAT SESSION TEXT

TECHNICAL FIELD

The present invention relates to electronic communications and in particular to preventing the capture of text from chat sessions.

BACKGROUND INFORMATION

Various technologies allow users to communicate in real time through instant messaging chat sessions. For example, Internet Relay Chat (IRC) services enable Internet users to participate in on-line conversations in real-time with other users. In such systems, users may be connected with one another through an IRC channel that is maintained by an IRC server. Users who have joined the IRC channel may transfer text via the IRC channel. An IRC client shows the names of currently active channels and enables users to join the channels. Chat rooms are often available through on-line services and provide communication channels that link computers and permit users to communicate by sending text messages in real-time. Real time text messaging can also take place through phones, PDAs, and other wireless devices without the use of the Internet.

Traditionally, there are laws that prevent the unauthorized recording of spoken conversations. For example, regulations may require the consent of all callers before a spoken telephone call can be recorded. To that end, a recording device for a telephone system may use a beep tone repeated at an interval throughout the conversation to indicate to another caller that the device is recording the conversation. Contrary to such principles regarding spoken conversations, typed conversations over computers are readily recorded without regard for whether all participants consent. Data processing systems used for participating in chat sessions provide numerous ways to record the text. However, a user may want to prevent the storage or distribution of the user's words from a chat session. Therefore, systems are needed that allow a user to limit how the user's words are used following a chat session. Specifically, a system is needed for allowing a user to prevent others from capturing and saving text from a chat session.

SUMMARY OF THE INVENTION

The present invention addresses the foregoing by providing a method, system, and program for allowing a user to disable capture features of a data processing system used for chat sessions. For example, features such as the print screen, file save, paste, text select, copy, and other screen capture features can be disabled unless the user agrees otherwise.

In one embodiment of the present invention, a method for preventing the capture of chat session text may include the steps of running a first chat application on a first client. The first chat application runs with a first operating system on the first client. The first chat application receives a first text message from a second chat application running on a second client. A stored preference of the second client is accessed for whether the user of the second client authorizes the capture of the first text message. If the second client does not authorize the capture of the first text message, a capture feature is disabled.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, refer to the following descriptions and accompanying drawings, in which.

DETAILED DESCRIPTION

In the following description, numerous specific details are set forth such as specific operating system commands, etc. to provide a thorough understanding of the present invention. However, it will be obvious to those skilled in the art that the present invention may be practiced without such specific details. In other instances, well-known circuits, software routines, or systems have been shown in block diagram form or flow diagram form in order to prevent obscuring the present invention in unnecessary detail. For the most part, details concerning software syntax and the like have been omitted inasmuch as such details are not necessary to obtain a complete understanding of the present invention. Further, details such as software syntax and specific operating system commands are within the skills of persons of ordinary skill in the relevant art.

Figure 1:
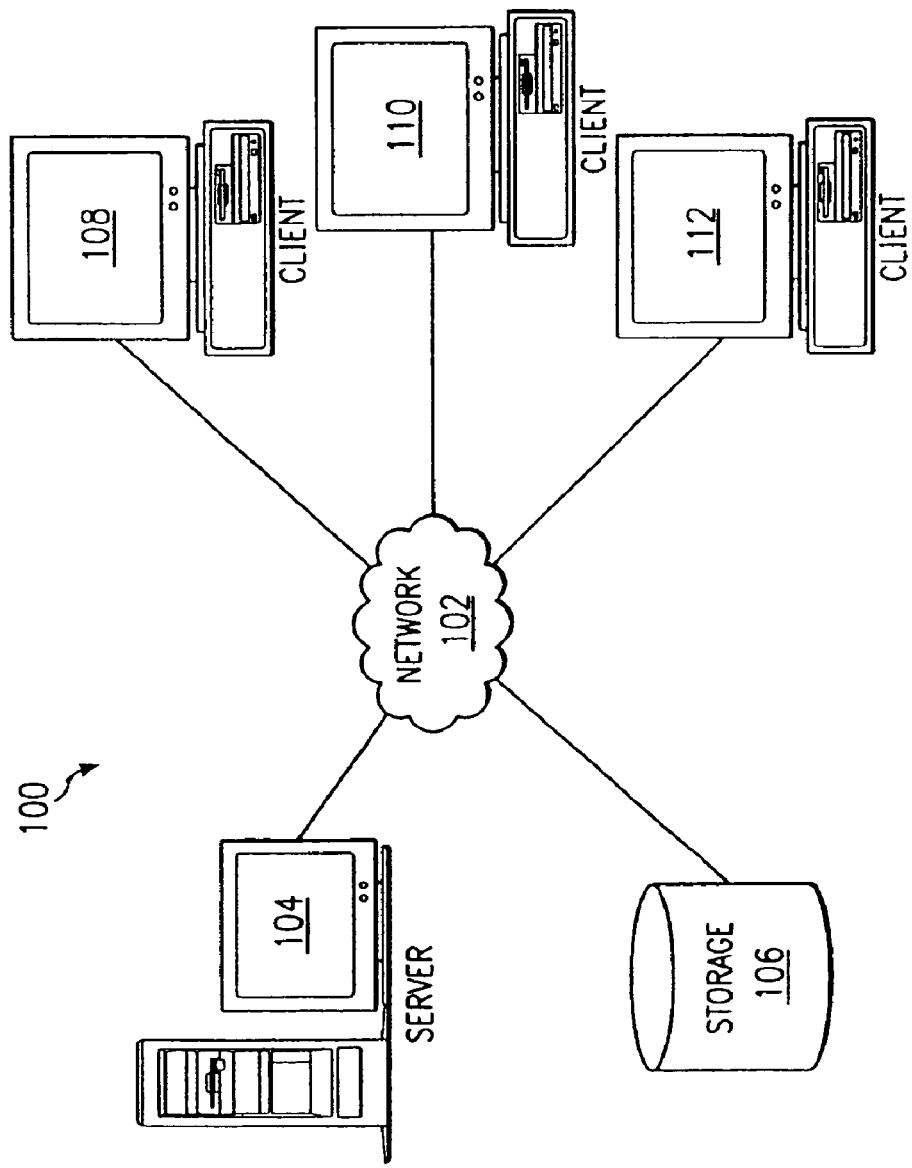
FIG. 1 illustrates an embodiment of the present invention of a distributed data processing system.
Figure 2:
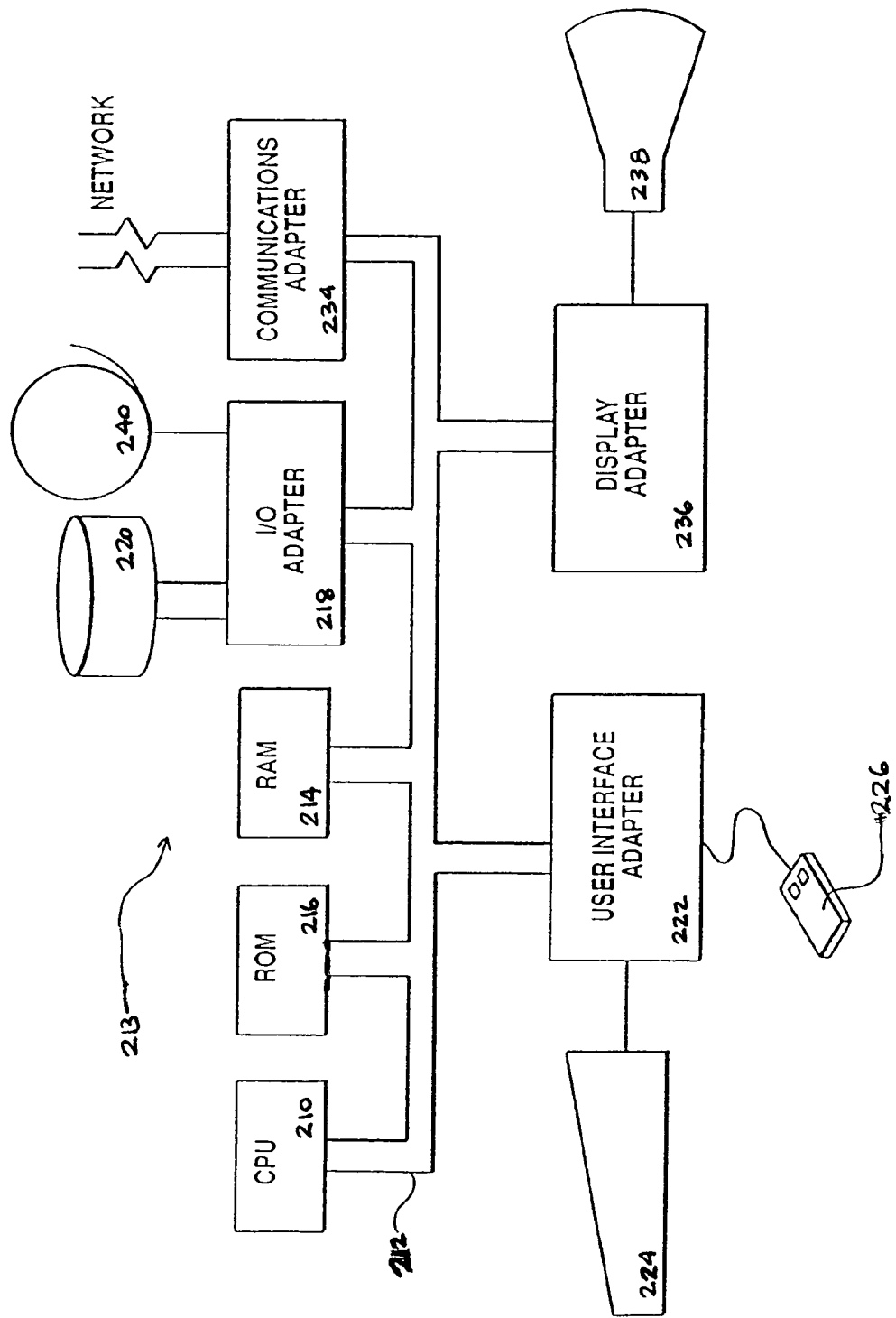
FIG. 2 illustrates a data processing system used as a client for practicing an embodiment of the present invention.

The present invention may be implemented on a variety of systems, including a variety of data processing systems, computing systems, and electronic devices under a number of different operating systems or platforms. The present invention could be executed in a data processing system that performs computing tasks such as manipulating data in storage that is accessible to the data processing system. In addition, the data processing system could include at least one output device and at least one input device. As shown in FIG. 1 and FIG. 2, an embodiment of the present invention could be implemented by running Instant Messaging (IM) client software on a desktop computer running a Microsoft™ Windows™ operating system and connected to the Internet over any Internet Service Provider. However, a messaging system for practicing the present invention may also be a network computer, a server system, or a mainframe computer. Other systems for practicing the present invention include a notebook computer, a palmtop computer, a personal digital assistant, a telephone, or any other data processing system having features for messaging and information services. Therefore, there is a broad range of platforms for performing the present invention.

Refer now to the drawings. In the drawings, depicted elements are not necessarily shown to scale and similar elements may be designated by the same reference numeral through the several drawings.

FIG. 1 illustrates a distributed data processing system 100 for practicing an embodiment of the present invention. Distributed data processing system 100 includes a network 102, which could be the medium used to provide communications links between various devices and computers connected together within distributed data processing system 100. Network 102 could include permanent connections made through wire, coaxial, or fiber optic cables. Network 102 could also include temporary connections made through telephone connections or wireless connections. Network 102 could include wireless hardware for transmitting packets or data between clients (e.g., 108, 110, and 112) and server 104.

In the depicted example, a server 104 is connected to network 102 along with storage unit 106. In addition, clients 108, 110, and 112 are connected to network 102. These clients 108, 110, and 112 may be, for example, personal computers, workstations, PDAs, or network computers. A "network computer" could be any data processing system, coupled to the network, which receives data such as a text message, a program, or another application from another data processing system coupled to the network. In the depicted example, server 104 provides data such as text messages, operating system images, and applications to clients 108-112. For example, client 112 could transmit a text message directly over network 102 to client 110, or the text message could travel through server 104 before reaching client 110. Server 104 could be a dedicated IM server running software designed to facilitate the transport of text messages between clients 108, 110, and 112. Distributed data processing system 100 may include additional servers, clients, and other devices not shown. FIG. 1 is intended as an example environment for practicing an embodiment of the present invention and is not intended as an architectural limitation for the present invention. For example, a chat session environment for practicing the present invention could include more than two or three clients. Further, in one embodiment of the present invention, a chat session could occur between two clients without server 104 or storage 106.

In one embodiment of the present invention operating on the World Wide Web (Web), an IM program application, such as Microsof™ Messenger, could reside on client 112 and receive IM text messages from client 110 through server 104 over network connection 102. Likewise, text messages could be sent from client 112 over network 102 to client 110 through server 104. Client 110 could be running an IM application such as Microsoft Messenger or any other IM application with compatible text messaging protocols. Server 104 could also distribute the text messages to client 108 or any other client (not shown) logged into the IM session. In such a manner, client computers 112 and 110 could communicate over network 102 and exchange text messages during an IM chat session.

Referring now to FIG. 2, an exemplary hardware configuration of data processing system 213 is shown having central processing unit (CPU) 210, such as a conventional microprocessor, and a number of other units interconnected via system bus 212. A data processing system 213 could be, for example, client 108 from FIG. 1. As depicted in FIG. 2, data processing system 213 could include random access memory (RAM) 214, read only memory (ROM) 216, and input/output (I/O) adapter 218 for connecting peripheral devices such as disk unit 220 and tape drive 240 to bus 212. Data processing system 213 could include user interface adapter 222 for connecting keyboard 224, mouse 226, and/or other user interface devices such as a touch screen device (not shown) to bus 212. Mouse 226 and keyboard 224 could be used to access many of the "capture features" that are disclosed herein. In addition, a text message could be entered into data processing system 213 through keyboard 224. Further, processing system 213 could include communications adapter 234 for connecting data processing system 213 to a data processing network, and display adapter 236 for connecting bus 212 to display device 238. For example, data processing system 213 could be client 108 (FIG. 1) and communications adapter 234 could be configured to allow a client 108 (FIG. 1) to communicate over network 102 (FIG. 1). In addition, a user of data processing system 213 could view text messages through display device 238. CPU 210 may include other circuitry not shown herein, including circuitry commonly found within a microprocessor, for example, execution unit, bus interface unit, arithmetic logic unit, etc. CPU 210 may also reside on a single integrated circuit. Disk unit 220 could be any machine-readable medium and could be used for storing a network adapter device driver in conjunction with the present invention.

The present invention may be embodied as a computer program product stored on, for example, a machine-readable medium as shown in FIG. 2 as item 220. The term "machine-readable medium" may include any medium used for providing instructions to CPU item 210 or other components of the data processing system shown as item 213 in FIG. 2. For example, machine-readable medium could be non-volatile media such as a floppy disk, memory stick, a flexible disk, a hard disk, magnetic tape or any other magnetic medium, a compact disc ROM (CD-ROM), or any other physical medium that data processing system 213 could use for reading and storing instructions.

Communications adapter shown as item 234 could be any device that provides a two-way data communications coupling to a network link shown as item 102 in FIG. 1. For example, communications adapter shown as item 234 could allow communication from client 112 (FIG. 1) to client 110 (FIG. 1) through one or more local area networks (LANs), wide area networks (WANs), or directly through an Internet Service Provider (ISP). The link between clients 112 (FIG. 1) and 110 (FIG. 1) could be provided through any combination of wireless or wired networks 102 (FIG. 1).

In an IM session, a client could enter a message via an I/O device such as keyboard item 224 from FIG. 2. The I/O device shown as keyboard item 224 could be connected to client 112 in FIG. 1. The message entered via the keyboard 224 attached to client 112 (FIG. 1) could be transmitted to messaging server 104 (FIG. 1). Messaging server 104 (FIG. 1) could then distribute the text message to other clients, for example clients 108 (FIG. 1) and 110 (FIG. 1) that are participating in the messaging session via network 102 (FIG. 1).

An embodiment of the present invention accesses profiles that contain stored settings for a user's capture preferences. For example, if user Bob communicates often with user Mike and if Bob trusts Mike, then Bob can modify his profile on his IM client machine to allow Mike to save transcript files from chat sessions between Bob and Mike. With such a profiling system, Bob would not have to bother answering questions regarding capture features from Mike's IM application each time Bob and Mike communication through an IM system. On the other hand, if Bob sometimes communicates with Linda and if he would rather not have Linda save or capture text from his IM session, then he could configure his profile to communicate only with Linda if her IM clients save commands have been disabled. In this way, Bob can attempt to limit how others use text from chat sessions with him. However, if Bob is not particularly worried about how his text is used, he could set up his profile to allow all users to save text from IM sessions with him. Similarly, he could configure his profile based on his chat list or buddy list. For example, he could have three users in his chat list—Mike, Linda, and Dave. He could adjust his profile to disable Linda from capturing any chat discussion between them. He could enable Dave to capture chat discussions. He could request to be prompted for capturing information regarding chat discussions with Mike. In this way, Bob could control how his chat session might be used.

In one embodiment of the present invention, a user could configure privacy settings at the user's client machine to instruct the message server to suspend sending messages to any unapproved client with capture rights enabled. For example, client 108 (FIG. 1) could instruct message server 104 (FIG. 1) not to send messages to client 110 (FIG. 1) if client 110 has "capture rights" enabled. "Capture rights" could refer to any right to save text entered during a chat session. The privacy settings could be saved as part of a profile for that user resident on the user's client or the IM server. For example, the profile for a user on client 108 (FIG. 1) could be saved on client 108 or the profile could be saved on message server 104 (FIG. 1). Depending on the user's concern for whether text is captured, the user could increase privacy settings stored in the profile to allow only certain machines to receive or capture messages from the user. On the other hand, the user could decrease the privacy settings to allow the user's client machine to transmit messages to all clients logged in to the IM session without regard for the capture settings of those clients. For example, a user on client 108 (FIG. 1) could modify his profile to transmit text messages to clients 110 (FIG. 1) and 112 (FIG. 1) without regard for the capture settings of clients 110 and 112.

In one embodiment of the present invention, the client application may be configured to disable use of capture features, for example the print screen, copy, paste, select, file printing and like functions included with many operating systems. In one embodiment, the client application may disable use of capture features by configuring the user's profile to allow capturing by approved clients while suspending capturing by other clients. Alternatively, a user could configure a profile on the user's client machine for automatically responding to requests from other clients to record or capture an IM session. In the stored profile, if the client making the request to capture is an approved client, the client (or IM application) receiving the request can respond by automatically sending approval to requests to capture or record messages. On the other hand, if the requesting client is an unknown client or is on a list of unapproved clients, the user's client (or IM application) can respond automatically in the negative to a request to capture or record messages. Stored profiles could reside on the client machine or the IM server and could be downloaded by clients before or during a chat session. The stored profiles could be updated by a user periodically and allow a user to declare his capture preferences to other clients. In another embodiment, a client could broadcast a user's capture preferences to another client at the beginning of a chat session or upon some other change in state regarding capturing. A change in state could be any change in the preferences of the client user regarding capture of the client user's text messages. At the beginning of a chat session or upon a change in state, a client could broadcast the preferences to other clients in a chat session or otherwise communicate preferences for whether past text, future text, or both were authorized for capture.

In one embodiment, a client application could use an operating system's Application Program Interface (API) to disable features used for capturing dialogue from a chat session. An API can be any set of commands that an application, such as an IM application, uses to request and carry out lower-level services performed by the operating system. For example, a Microsoft™ Windows™ (Windows™) API contains many procedures capable of performing tasks for displaying screen windows, using printers, displaying text, copying text to a buffer such as the clipboard, minimizing windows, maximizing windows, using menus, etc. The API can be called by any program running under Windows™. For example, an IM application could call an API to disable the user's ability to capture text messages by copying text to the clipboard. In another embodiment of the present invention, an IM application queries another user's profile to determine whether that user approves of the capture of text by the IM application or associated operating system. If the queried profile contains settings to prevent capture of text, the IM application can use an API to disable the capture of text from the chat session.

A user may capture text from a text messaging session in various ways. The term "capture" feature can refer to any feature such as print screen, right-clicking a mouse, highlighting text, CTRL C, CTRL insert, or other functions used within an application or operating system to copy text from a text messaging system for later use. For example, when a computer user presses the Print Screen key (sometimes labeled as PrtScn), a copy of whatever is on the screen is normally copied to the clipboard in a Windows™ operating system. The user can then paste the clipboard into a drawing or word processing program for editing or saving. To prevent such capturing, an IM application running on the client can be programmed to check a user's profile for permissions before copying text to the clipboard. By disabling the Print Screen key, a client can make it more difficult for an IM user to save images of textual dialogue.

Highlighting text and copying into a word processing document is another method by which an IM user could save textual dialogue from a chat session. In one embodiment of the present invention, an IM application could also disable the ability of users to highlight text within the IM window. Further, the IM agent could disable the users' ability to use copy commands within the operating system. For example, in the Windows™ operating system, the IM application on the client could disable copying achieved by right-clicking a mouse, by pressing CTRL and C simultaneously, and by pressing CTRL and insert simultaneously.

Figure 3:
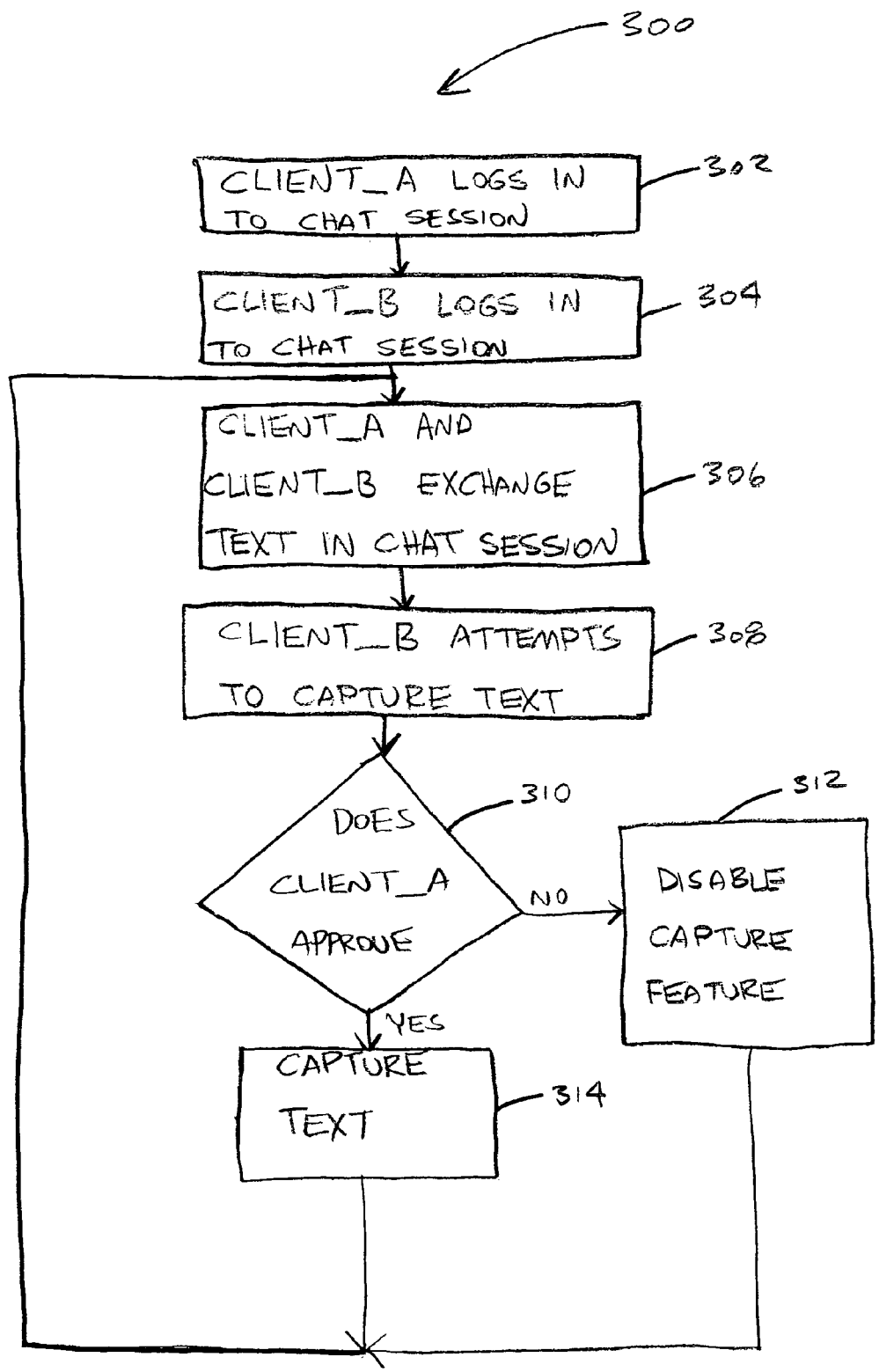
FIG. 3 is a flowchart of a method for disabling capture features performed in accordance with an embodiment of the present invention.

Referring now to FIG. 3, FIG. 3 is a flowchart method 300 for disabling capture features in accordance with an embodiment of the present invention. In step 302, CLIENT_A logs into a chat session. CLIENT_A could be client 108 (FIG. 1). CLIENT_A could log into message server 104 (FIG. 1) by providing message server 104 with authentication information such as a user name and password. In step 304, CLIENT_B logs into the chat session. For example, client 110 (FIG. 1) could log into IM message server 104 (FIG. 1) by providing authentication information such as a user name and password. CLIENT_A and CLIENT_B exchange text messages as shown in step 306. Following an exchange of text messages, CLIENT_B attempts in step 308 to capture text from the chat session. In response, the client application running on CLIENT_B's client determines in step 310 whether CLIENT_A approves of CLIENT_B capturing the text. In one embodiment of the present invention, CLIENT_B determines in step 310 whether CLIENT_A approves by referring to CLIENT_A's profile settings regarding CLIENT_B. In one embodiment of the present invention, CLIENT_A's profile settings are within a profile specific to the current user of CLIENT_A where such a profile is stored on the CLIENT_A client data processing system. In an alternative embodiment, the user of CLIENT_A could have a profile stored on an IM message server, such as server 104 from FIG. 1. CLIENT_A's profile could be downloaded to CLIENT_B's client data processing machine. For example, CLIENT_A's profile could be downloaded from server 104 (FIG. 1) or client 108 (FIG. 1) at any time during the chat session or at a time when CLIENT_B attempts to capture its text. If it is determined in step 310 that CLIENT_A approves of CLIENT_B's attempts to capture the text, then in step 314 CLIENT_B captures the text and the methodology 300 cycles to step 306 for the potential exchange of more text. If CLIENT_A does not approve in step 310, in step 312 CLIENT_B's ability to capture the text is disabled.

Figure 4:
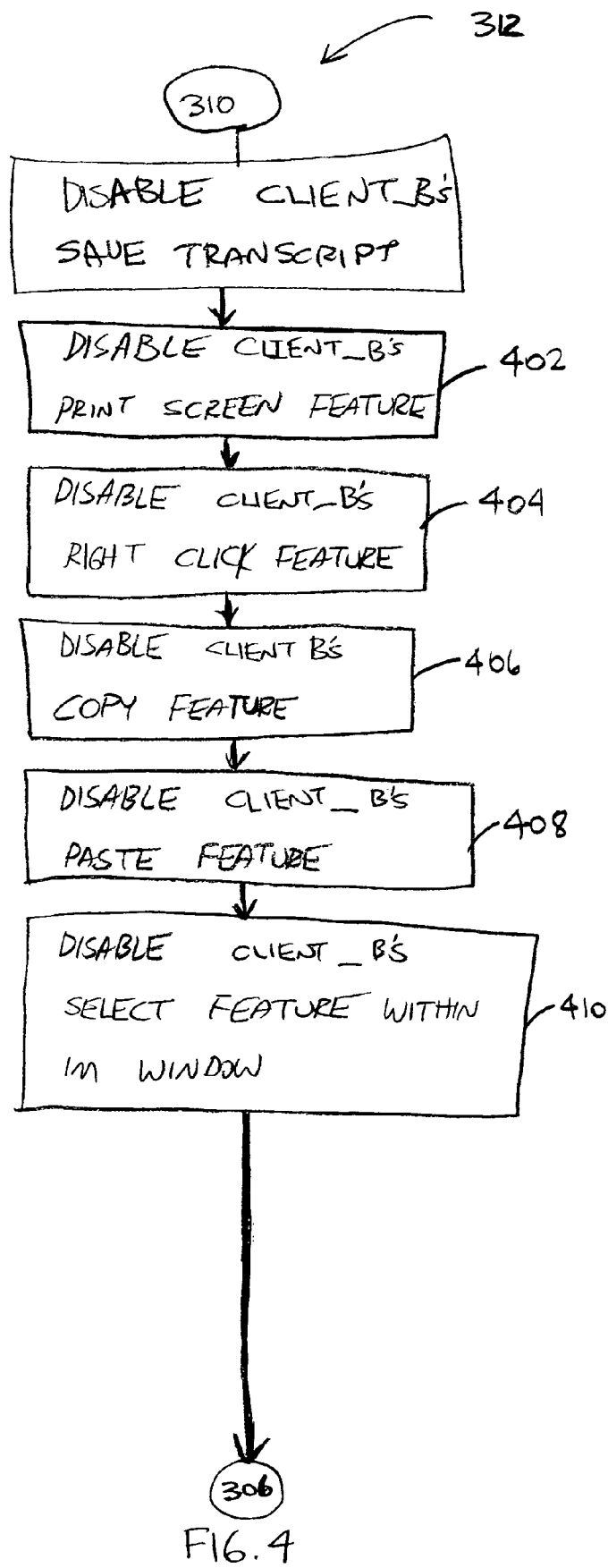
FIG. 4 is a flowchart of a method for disabling capture features of a client performed in accordance with an embodiment of the present invention.

Referring to FIG. 4, FIG. 4 is a flowchart of a method for disabling a client's capture features in accordance with an embodiment of the present invention. The steps shown in FIG. 4 could be performed as part of step 312 in FIG. 3. Following a determination in step 310 that CLIENT_A does not approve of CLIENT_B's capture, CLIENT_A or IM message server 104 (FIG. 1) could send a request to CLIENT_B's IM application informing it to disable CLIENT_B's print screen feature in step 402. Alternatively, CLIENT_B could access a stored profile of CLIENT_A for determining capture rights. In addition, CLIENT_B's right-click feature can be disabled in step 404, CLIENT_B's copy feature can be disabled in step 406, CLIENT_B's paste feature can be disabled in step 408, and CLIENT_B's select feature within the IM window can be disabled in step 410. A right-click feature could be one or more commands a user accesses by clicking a mouse button on the right side of the mouse. For example, in a Microsoft™ Windows™ system, the operating system or mouse driver could be configured such that a right-click of the mouse would initiate a drop down menu with commands for copying and cutting text. On the other hand, the operating system or mouse driver could be configured such that a middle button or left button initiated a drop down menu. The term right-click is used in this application merely as an example of a button on a keyboard, mouse, or other peripheral device for automatically initializing a routine that provides a user a drop-down menu with commands for capturing screen text through cutting or copying, for example.

In one embodiment, steps 402, 404, 406, 408 and 410 can be accomplished by reference to a set of API commands for the operating system. Alternatively, in another embodiment of the present invention, capture features may be disabled by assigning values to certain flags or variables on CLIENT_B's client machine. When CLIENT_B's IM application receives a command for capturing text or screen images, the IM application could refer to the flag settings or variable values to determine whether capturing is permitted. Following the disable of the capture features in steps 402-410, the methodology continues to step 306 in FIG. 3.

Figure 5:
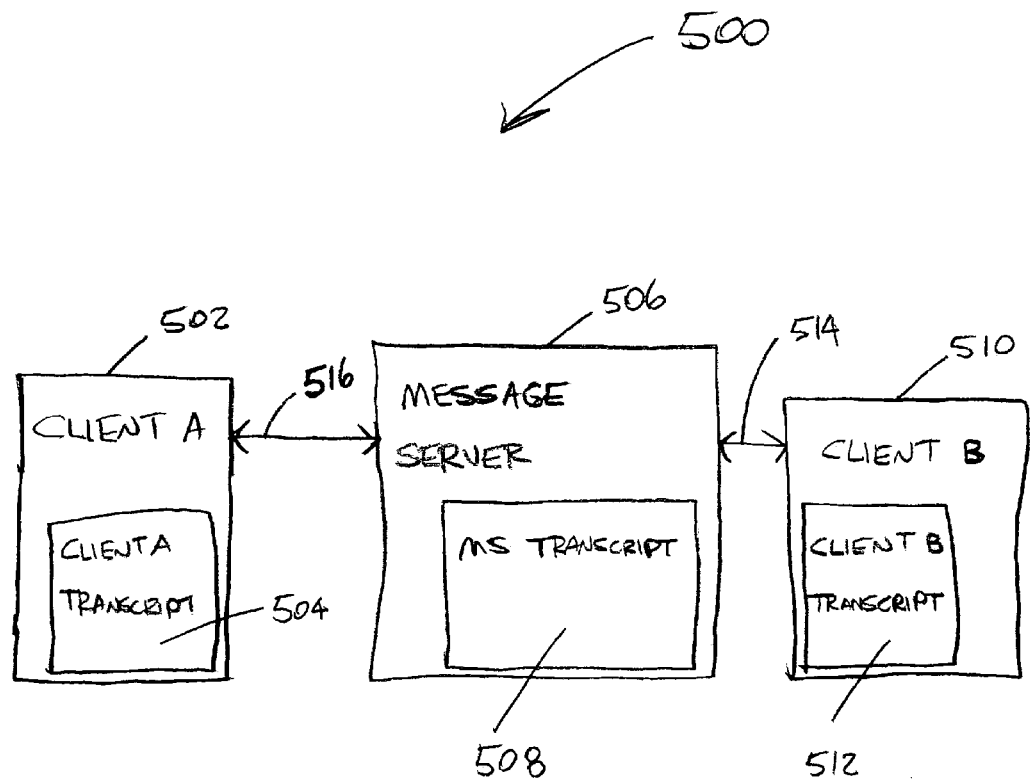
FIG. 5 illustrates an embodiment of the present invention of a hardware environment configured to store transcripts of chat sessions.

Referring to FIG. 5, FIG. 5 illustrates an embodiment of the present invention of a hardware environment 500. CLIENT_A, shown as item 502, communicates with IM message server 506 over line 516. Message server 506 could be IM message server 104 from FIG. 1. Likewise, CLIENT_A, shown as item 502, could be client 112 from FIG. 1. A CLIENT_A transcript, shown as item 504, is coupled to CLIENT_A 502. The CLIENT_A transcript 504 could be maintained by the CLIENT_A IM application during an IM chat session between CLIENT_A 502 and CLIENT_B 510. The CLIENT_A transcript 504 could contain text sent by CLIENT_A 502 and responsive text sent by CLIENT_B 510. CLIENT_B, shown as item 510, could contain a similar transcript shown as CLIENT_B transcript 512. Conceivably, the CLIENT_A transcript 504 and the CLIENT_B transcript 512 would be very similar and only the point of view from which the transcript was stored would be different. In addition, message server 506 may maintain a transcript shown as MS transcript 508. In one embodiment of the present invention, CLIENT_A 502 could disable CLIENT_B's ability for storing the CLIENT_B transcript 512. Likewise, CLIENT_B 510 could disable CLIENT_A's ability to store the CLIENT_A transcript 504. In the alternative, CLIENT_A 502 could instruct message server 506 to not store the MS transcript shown as item 508. Alternatively, CLIENT_A 502 could instruct message server 506 to not send MS transcript 508 to CLIENT_B 510 in the event CLIENT_B 510 requests MS transcript 508. In this way, for example, CLIENT_A 502 could protect the privacy of conversations held between CLIENT_A 502 and CLIENT_B 510.

Figure 6:
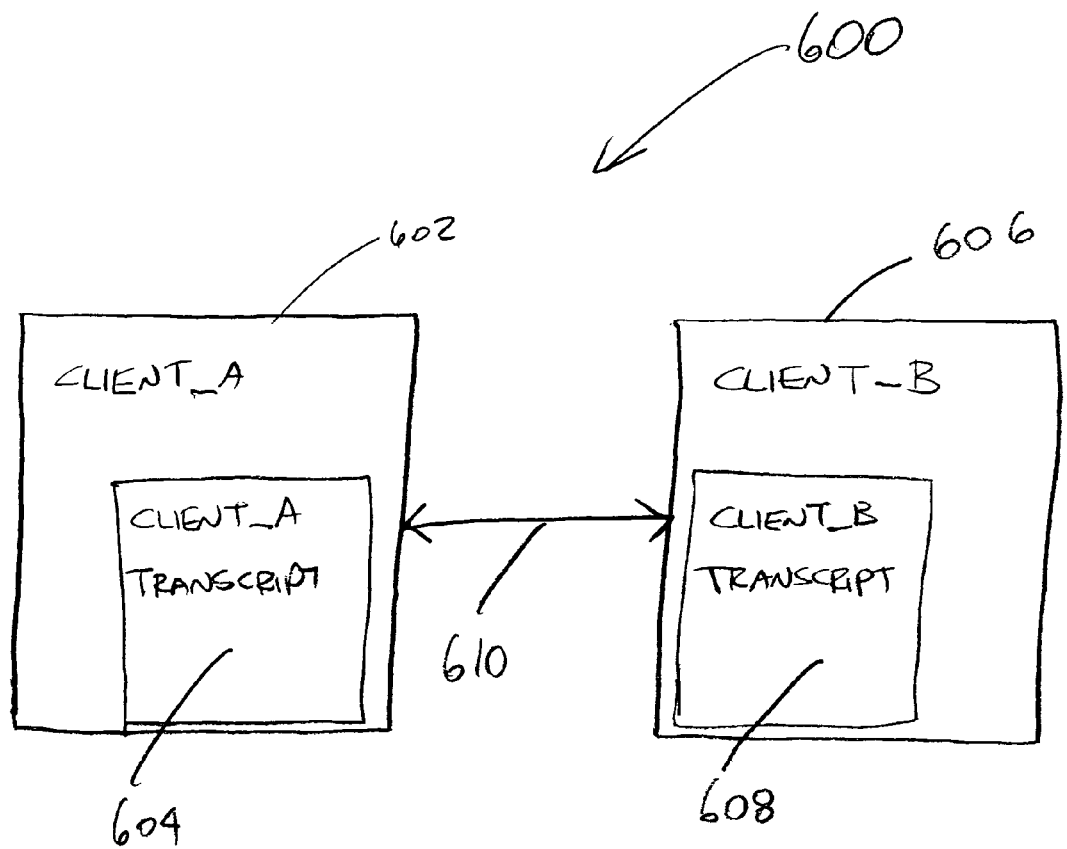
FIG. 6 illustrates an embodiment of the present invention of a hardware environment containing two clients.

Referring to FIG. 6, FIG. 6 illustrates an alternative embodiment of the present invention in which CLIENT_A 602 communicates with CLIENT_B 606 through a medium shown as item 610. Item 610 is shown for illustration purposes to show text messages going back and forth between CLIENT_A 602 and CLIENT_B 606. Item 610 may be wireless or wired. CLIENT_A 602 potentially stores a CLIENT_A transcript shown as item 604. Likewise, CLIENT_B 606 potentially stores a CLIENT_B transcript shown as item 608. If CLIENT_A 602 is concerned about privacy, CLIENT_A 602 can disable the ability of CLIENT_B 606 to store the CLIENT_B transcript shown as item 608. In the alternative, CLIENT_A 602 can request to CLIENT_B 606 that CLIENT_B 606 disable its ability to store CLIENT_B transcript 608. In this way, CLIENT_A 602 can disable the ability of CLIENT_B 606 to record the chat session between CLIENT_A 602 and CLIENT_B 606. In still another embodiment of the present invention, if CLIENT_B attempts to store or transmit text from a session with CLIENT_B 606, CLIENT_B's IM application can refer to CLIENT_A's stored profile to determine whether CLIENT_A 602 approves of such storage.

Figure 7:
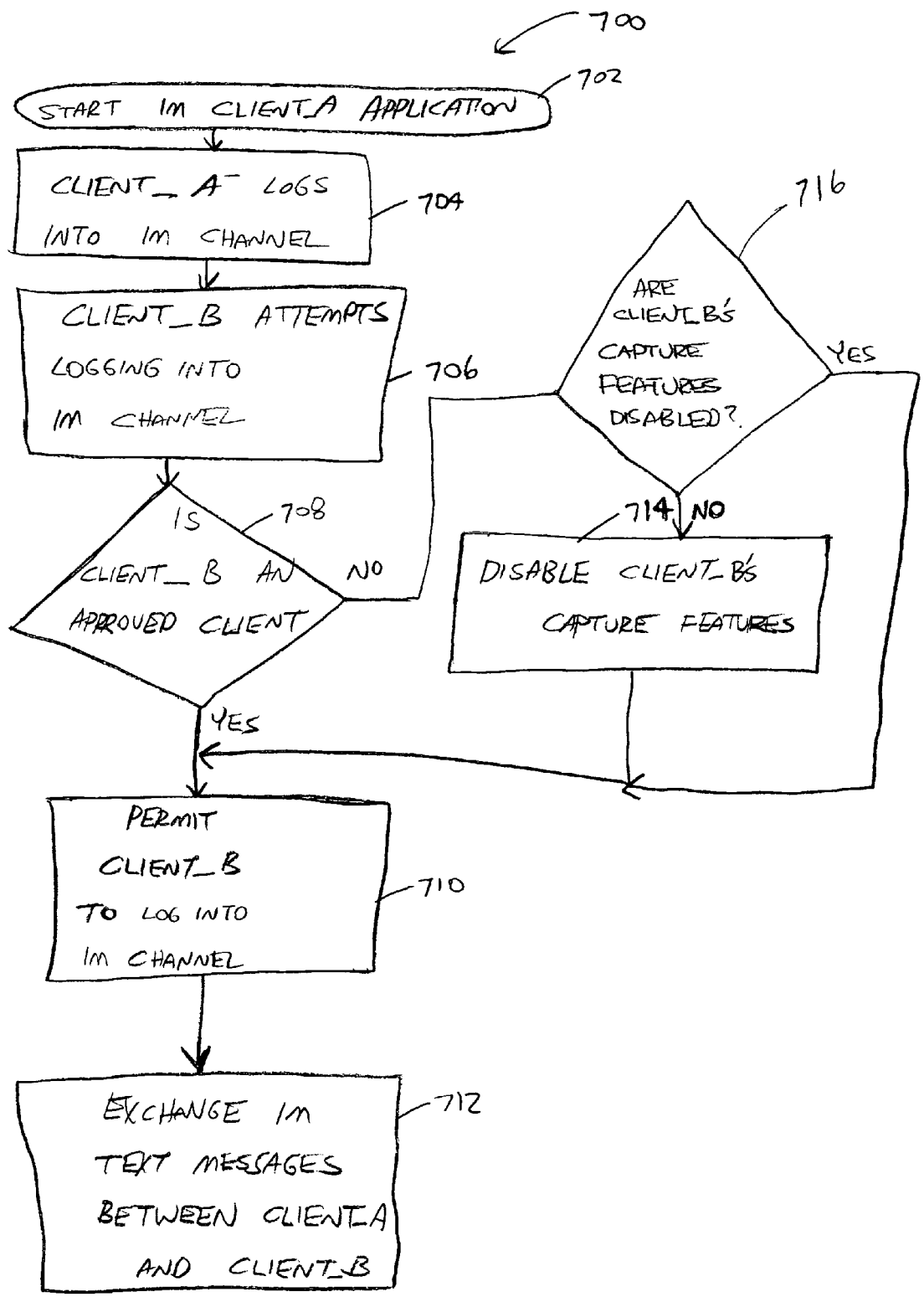
FIG. 7 is a flowchart of a method for disabling capture features in accordance with an embodiment of the present invention.

Referring to FIG. 7, FIG. 7 is a flowchart of a method 700 for disabling capture features in accordance with an embodiment of the present invention. In step 702, an IM client application begins running on CLIENT_A. CLIENT_A could be any client such as client 108 from FIG. 1. After initiation of the IM client application in step 702, CLIENT_A logs into the IM channel in step 704. In one embodiment of the present invention, CLIENT_A logs into the IM channel by providing authentication information to IM server 104 (FIG. 1). Next, CLIENT_B attempts to log into the IM channel in step 706. In step 708, CLIENT_A determines whether CLIENT_B is an approved client by referring to an approved client list on CLIENT_B. The approved client list could be stored in storage item 220 as shown in FIG. 2. If CLIENT_A determines CLIENT_B to be an approved client in step 708, then CLIENT_B is permitted to log into the IM channel in step 710. If in step 708 CLIENT_B is not an approved client, then in step 716 CLIENT_A determines whether CLIENT_B's capture features are disabled. In the alternative, an IM server could determine whether CLIENT_B's capture features are disabled and report the results to CLIENT_A. If CLIENT_B's capture features are disabled, then in step 710, CLIENT_B is permitted to log into the IM channel. If CLIENT_B's capture features are not disabled, then CLIENT_A attempts to disable CLIENT_B's capture features in step 714. Alternatively, CLIENT_A requests to CLIENT_B that CLIENT_B disable CLIENT_B's capture features. After disabling CLIENT_B's capture features in step 714, CLIENT_B is permitted to log into the IM channel in step 710. After step 710, the exchange of IM text messages between CLIENT_A and CLIENT_B occurs in step 712.

Figure 8:
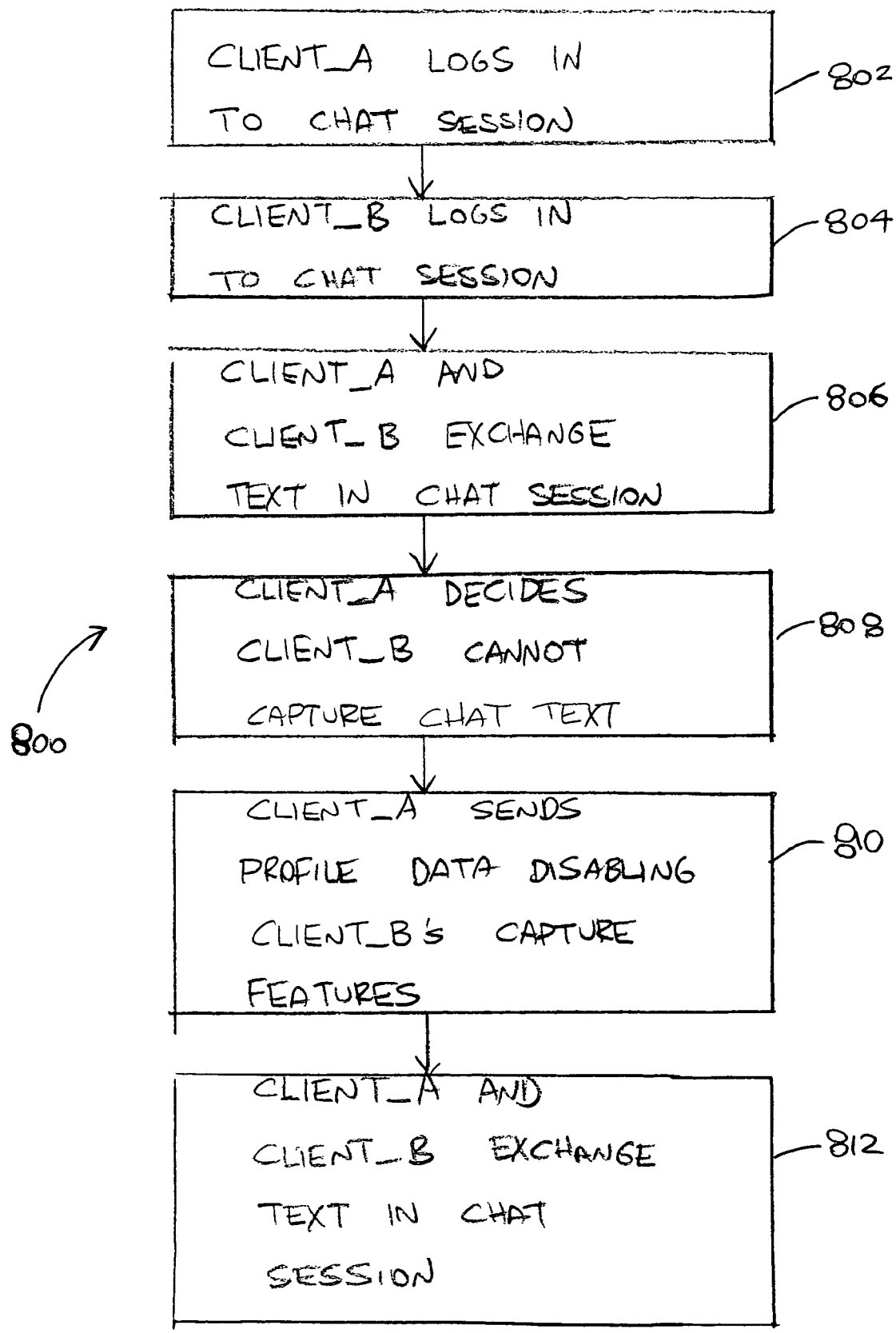
FIG. 8 is a flowchart of a method for disabling capture features in accordance with an embodiment of the present invention.

Referring to FIG. 8, FIG. 8 is a flowchart of a method for disabling capture features in accordance with an embodiment of the present invention. In step 802, CLIENT_A logs into a chat session by providing authentication information to IM message server 104 (FIG. 1). In step 804, CLIENT_B logs into the chat session by communicating with IM message server 104 (FIG. 1), for example. In step 806, CLIENT_A and CLIENT_B exchange text in the chat session. In step 808, CLIENT_A decides that CLIENT_B should not capture text from the chat session. In step 810, CLIENT_A sends profile data with capture preferences to CLIENT_B's IM chat application, which results in a disabling of CLIENT_B's capture features for the remainder of the chat session. In one embodiment of the present invention, CLIENT_A broadcasts preferences to CLIENT_B upon a change in state regarding CLIENT_A. A change in state regarding CLIENT_A could be any change in the preferences of the user CLIENT_A regarding CLIENT_B's capture of the user's text messages. A change in state could also occur at the beginning a chat sessions, such as when CLIENT_A logs into a chat session channel. CLIENT_A could broadcast or otherwise communicate to CLIENT_B preferences for whether past text, future text, or both are authorized for capture. In step 812, CLIENT_A and CLIENT_B continue to exchange text in the chat session. Methodology 800 represents an embodiment of the present invention in which a client decides in the middle of a chat session to disable another client's capture features.

Figure 9:
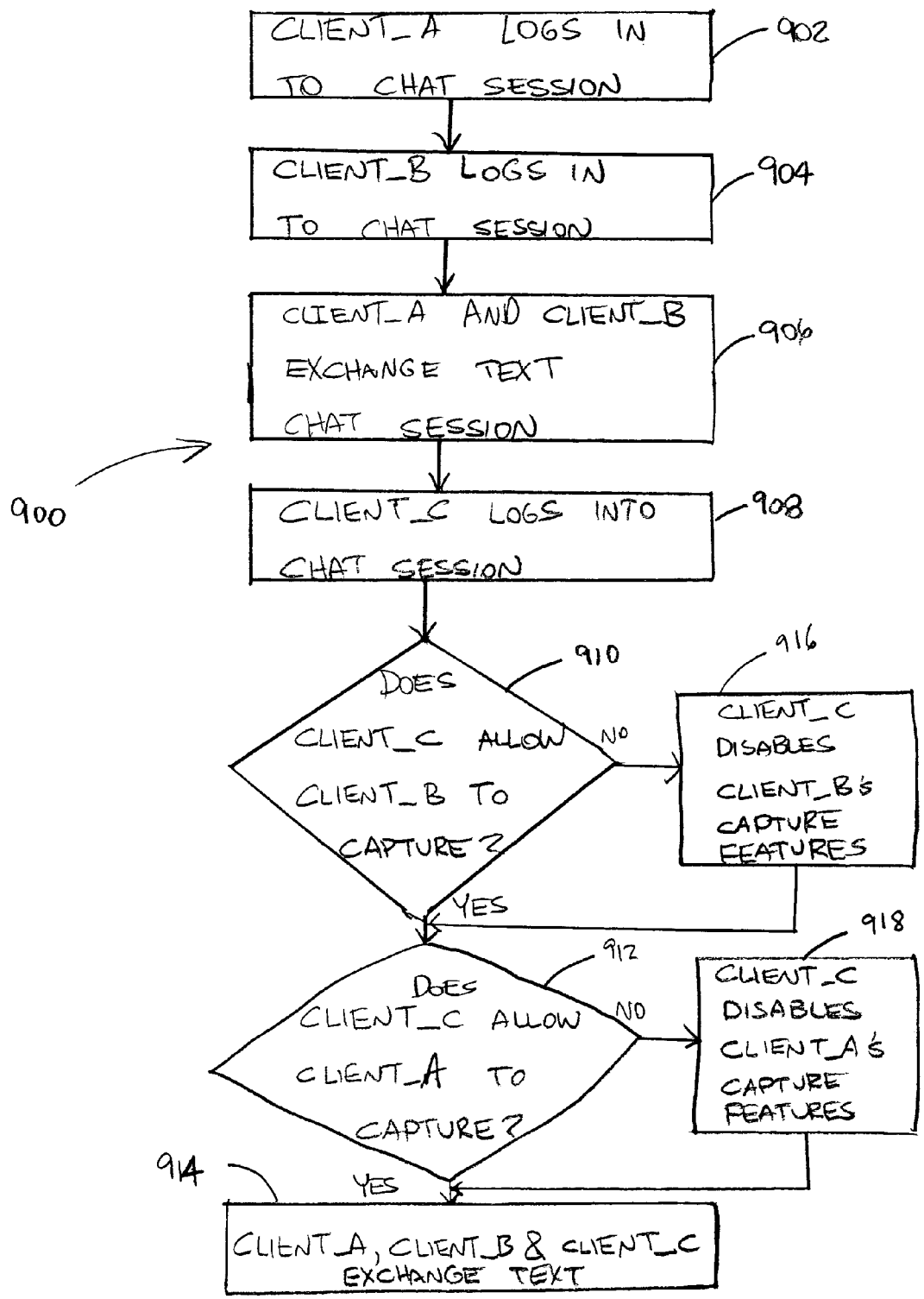
FIG. 9 is a flowchart of a method for disabling capture features in accordance with an embodiment of the present invention.

Referring to FIG. 9, FIG. 9 is a flowchart of a method 900 for disabling capture features in accordance with an embodiment of the present invention. Methodology 900 shows example steps that CLIENT_A and CLIENT_B may take upon CLIENT_C logging into an existing chat session. In step 902, CLIENT_A logs into a chat session. In step 904, CLIENT_B logs into the chat session. In step 906, CLIENT_A and CLIENT_B exchange text. In step 908, CLIENT_C logs into the chat session. In step 910, CLIENT_C determines whether to allow CLIENT_B to capture text from the chat session. CLIENT_C could make the determination from step 910 by accessing a list of approved clients in CLIENT_C's profile to determine whether CLIENT_B is in the list of approved clients. The list of approved clients can be stored on CLIENT_C's approved client list stored on item 220, for example. If CLIENT_C does not approve of CLIENT_B capturing text from the chat session in step 916, CLIENT_C disables CLIENT_B's capture features. In step 912, CLIENT_C determines whether to allow CLIENT_A to capture text from the chat session. If CLIENT_C allows CLIENT_A to capture text, methodology 900 proceeds to step 914 wherein CLIENT_A, CLIENT_B, and CLIENT_C exchange text. However, if in step 912 it is determined that CLIENT_C does not allow CLIENT_A to capture text, then in step 918 CLIENT_C disables CLIENT_A's capture features. Alternatively, CLIENT_C requests to CLIENT_A's IM application that CLIENT_A's capture features be disabled. In steps similar to 910 and 912, CLIENT_A and CLIENT_B can determine individually whether to allow CLIENT_C to capture text from the chat session by checking profiles stored on CLIENT_A and CLIENT_B, respectively. In turn, CLIENT_A or CLIENT_B can disable CLIENT_C's capture features, or request that CLIENT_C disable its own capture features. Methodology 900 demonstrates how an embodiment of the present invention could handle a scenario in which a third client joins an existing chat session. Methodology 900 could be extended to chat sessions involving four, five, or more clients.

Figure 10:
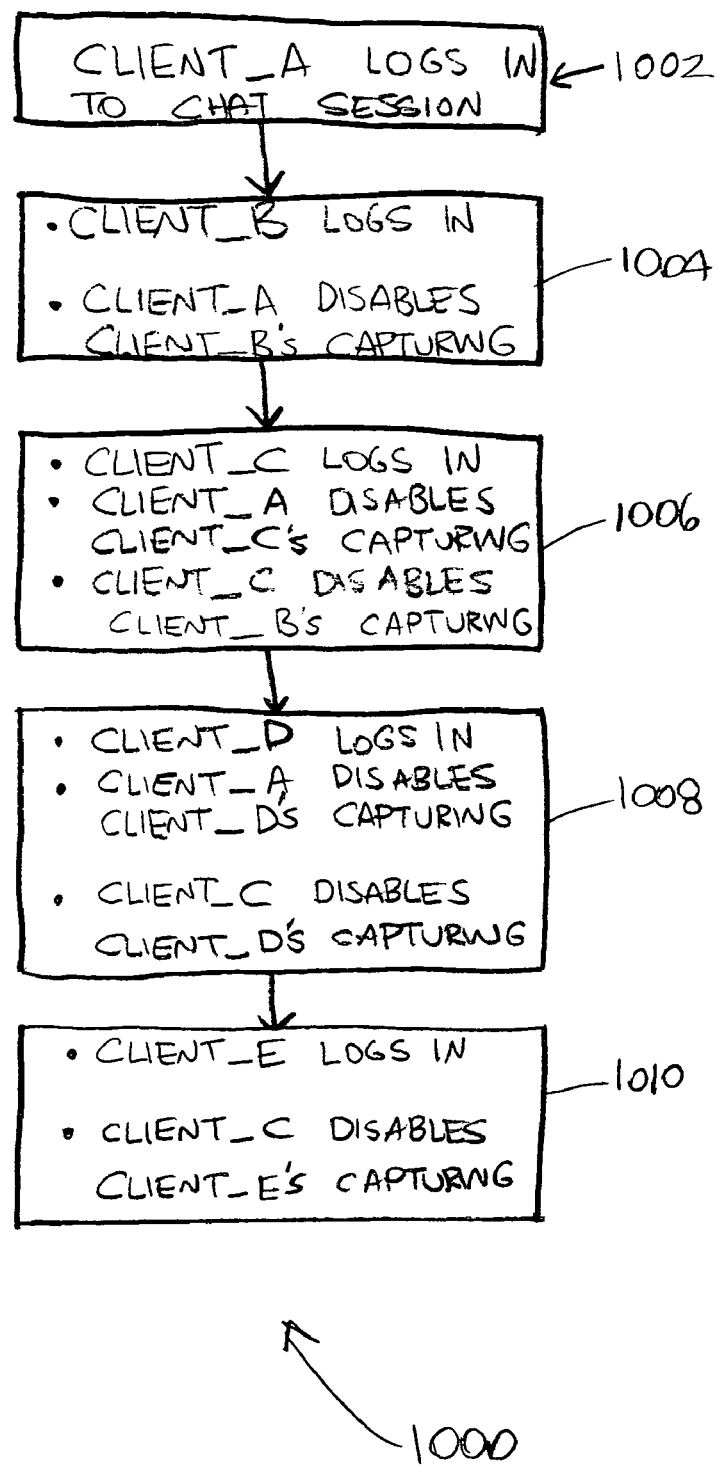
FIG. 10 is a flowchart of a method for disabling capture features in accordance with an embodiment of the present invention.

FIG. 10 is a flowchart of an example scenario 1000 wherein multiple clients log into a chat session and, depending upon each client's preference, other clients' capture features are disabled. In step 1002, CLIENT_A logs into a chat session. In step 1004, CLIENT_B logs into the chat session and CLIENT_A, after referring to CLIENT_A's profile, disables CLIENT_B's capture features. In step 1006, CLIENT_C logs into the chat session and CLIENT_A disables CLIENT_C's capture features. In addition, CLIENT_C disables CLIENT_B's capture features. Note that CLIENT_B does not disable the capture features of CLIENT_A or CLIENT_C, because the user of CLIENT_B may not be concerned whether other clients capture text. In step 1008, CLIENT_D logs into the chat session. CLIENT_A disables CLIENT_D's capture features. CLIENT_C disables CLIENT_D's capture features. Once again, CLIENT_B does not disable CLIENT_D's capture features. Like CLIENT_B, CLIENT_D does not disable the capture features of any other clients in step 1008. In step 1010, CLIENT_E logs into the chat session. CLIENT_C disables CLIENT_E's capture features. Note, however, that CLIENT_A does not disable CLIENT_E's capture features. CLIENT_A does not disable CLIENT_E's capture features because upon accessing CLIENT_A's list of approved clients, CLIENT_A determines that CLIENT_E is an approved client. The example scenario shown in FIG. 10 demonstrates that three or more clients can log into the same chat session and that three or more clients can handle each client's permissions for capturing text in a different manner in accordance with the present invention. In one embodiment, any of the clients shown in FIG. 10 may disable another client's capture features by requesting that the other client's IM application disable capture features. For instance, CLIENT_A's IM application may send a request to CLIENT_B's IM application to disable CLIENT_B's capture features. In another embodiment, rather than actively disabling CLIENT_B's capture features, CLIENT_A could store preferences of a user of CLIENT_A in a profile and rely on CLIENT_B to disable CLIENT_B's capture features after accessing the profile of CLIENT_A. In summary, there are countless scenarios for practicing the present invention and the examples shown in FIGS. 3-10 are not meant to limit the scope of the claims to a particular number of clients.

Although the present invention and its advantages have been described in detail, it should be understood the various changes, substitutions, and alterations could be made herein without departing from the spirit and scope of the invention as defined by the appended claims.

What is claimed is:
1. A method for preventing a capture of chat session text, the method comprising:
    logging into a chat session by a first client;
    transmitting a first text message by a first chat application running on said first client to a second chat application running on a second client, wherein said second client is logged into said chat session;
    accessing a profile of said first client regarding approval of capturing text by said second client; and transmitting a request to said second chat application running on said second client to disable a text capturing feature of said second client to capture said first text message;

wherein said accessing of said profile of said first client occurs in response to an attempt by said second client to capture said first text message.

2. The method as recited in claim 1 further comprises:
disabling said text capturing feature of said second client to capture said first text message if said first client does not authorize said second client to capture text messages transmitted by said first client.

3. The method as recited in claim 2, wherein said disabling said text capturing feature of said second client comprises disabling an operating system's copy, text-select, paste, and print screen features to capture text messages.

4. The method as recited in claim 1 further comprises:
logging into said chat session by a third client;
accessing a profile of said third client regarding approval of capturing text by said first client and said second client;
disabling a text capturing feature of one or more of said first client and said second client if said profile indicates that one or more of said first client and said second client are not authorized to capture text messages transmitted by said third client.

5. The method as recited in claim 1, wherein said text capturing feature comprises one of the following: a print screen feature for copying said first text message to a buffer, and highlighting said first text message and copying said first text message into a word processing document.

6. A computer program product embodied in a computer readable storage medium for preventing a capture of chat session text, the computer program product comprises the programming instructions for:
logging into a chat session by a first client;
transmitting a first text message by a first chat application running on said first client to a second chat application running on a second client, wherein said second client is logged into said chat session;
accessing a profile of said first client regarding approval of capturing text by said second client; and
transmitting a request to said second chat application running on said second client to disable a text capturing feature of said second client to capture said first text message;
wherein the programming instruction for accessing said profile of said first client occurs in response to an attempt by said second client to capture said first text message.

7. The computer program product as recited in claim 6 further comprises the programming instructions for:
disabling said text capturing feature of said second client to capture said first text message if said first client does not authorize said second client to capture text messages transmitted by said first client.

8. The computer program product as recited in claim 7, wherein the programming instruction for disabling said text capturing feature of said second client comprises the programming instruction for disabling an operating system's copy, text-select, paste, and print screen features to capture text messages.

9. The computer program product as recited in claim 6 further comprises the programming instructions for:
logging into said chat session by a third client;
accessing a profile of said third client regarding approval of capturing text by said first client and said second client;
disabling a text capturing feature of one or more of said first client and said second client if said profile indicates that one or more of said first client and said second client are not authorized to capture text messages transmitted by said third client.

10. The computer program product as recited in claim 6, wherein said text capturing feature comprises one of the following: a print screen feature for copying said first text message to a buffer, and highlighting said first text message and copying said first text message into a word processing document.

11. A system, comprising:
a memory unit for storing a computer program for preventing a capture of chat session text; and
a processor coupled to said memory unit, wherein said processor, responsive to said computer program, comprises:
circuitry for logging into a chat session by a first client;
circuitry for transmitting a first text message by a first chat application running on said first client to a second chat application running on a second client, wherein said second client is logged into said chat session;
circuitry for accessing a profile of said first client regarding approval of capturing text by said second client; and
circuitry for transmitting a request to said second chat application running on said second client to disable a text capturing feature of said second client to capture said first text message;
wherein said circuitry for accessing said profile of said first client occurs in response to an attempt by said second client to capture said first text message.

12. The system as recited in claim 11, wherein said processor further comprises:
circuitry for disabling said text capturing feature of said second client to capture said first text message if said first client does not authorize said second client to capture text messages transmitted by said first client.

13. The system as recited in claim 12, wherein said circuitry for disabling said text capturing feature of said second client comprises disabling an operating system's copy, text-select, paste, and print screen features to capture text messages.

14. The system as recited in claim 11, wherein said text capturing feature comprises one of the following: a print screen feature for copying said first text message to a buffer, and highlighting said first text message and copying said first text message into a word processing document.

* * * * *